United States Patent Office 3,144,415
Patented Aug. 11, 1964

3,144,415
PROCESS FOR INCREASING THE HYDROCRACKING AND HYDROGENATING ACTIVITY OF A SUPPORTED NICKEL CATALYST USING PHOSPHINE
Morris B. Silverman, Portland, Oreg., assignor to California Research Corporation, San Francisco, Calif., a corporation of Delaware
No Drawing. Filed Mar. 21, 1961, Ser. No. 97,168
1 Claim. (Cl. 252—437)

This invention relates to a process for increasing the hydrocracking and hydrogenating activity of a supported nickel catalyst in the presence of phosphine.

As is well known to those skilled in the petroleum refining art, hydrocracking is a reaction wherein hydrocarbons are converted to lower boiling products in the presence of added hydrogen and a catalyst at elevated temperature and pressure. It is also known that catalysts having metallic nickel, or compounds thereof, disposed on active siliceous supports promote hydrocracking, as for example, the conversion of higher boiling petroleum distillates to lower boiling gasoline fractions. In general, it has been preferred to use a supported nickel sulfide catalyst rather than one containing metallic nickel, since the former promotes less hydrogenation, thereby producing a product containing more high octane number aromatic hydrocarbons and less saturated cyclic compounds. However, in some situations it may be necessary, even with nickel sulfide catalysts, to reform the hydrocracked gasoline product so as to obtain a gasoline with a sufficiently high octane number to meet the requirements of modern, high-compression engines. In such a situation, the degree of hydrogenation of the cyclic compounds in the cracked gasoline produce is relatively unimportant, since they will be dehydrogenated to aromatic hydrocarbons in the reforming zone. Therefore, the important consideration is to increase the cracking activity to attain maximum yield of cracked products and to rely upon the reforming step for their octane number improvement.

I have found that both the hydrocracking and hydrogenating activity of a catalyst having an essentially non-sulfided nickel component disposed upon an active, siliceous cracking support can be increased by contacting the catalyst with phosphine ($pH_3$).

DESCRIPTION OF CATALYST ACTIVATED BY THE PRESENT INVENTION

The support employed in the catalyst, herein referred to as an active siliceous cracking support, includes any natural or synthetic siliceous composition of acid character which is effective for the cracking of hydrocarbons and which contains at least about 40 percent by weight of silica, calculated as $SiO_2$. Illstrative of the cracking supports that can be employed are those natural cracking catalysts such as bentonite and kaolin clays, and the conventional synthetic catalysts such as silica-alumina, silica-magnesia, silica-zirconia, and silica-alumina-zirconia. In addition, satisfactory supports are the synthetic metal aluminum silicates (such as the synthetic chabazites commonly referred to as "molecular sieves") that impart the necessary cracking activity to the catalyst. A preferred active siliceous component comprises synthetically prepared composites of silica and alumina containing from 70 to 99 percent of the silica component.

The above-noted siliceous cracking catalysts, which form the support of the present catalyst, can be prepared by any known method. For example, synthetic silica-alumina composites can be prepared by combining an aqueous solution of an aluminum salt, suitably adjusted in acidity with a solution of sodium silicate under such conditions that the corresponding gels are coprecipitated in intimate admixture. Or, silica gel and alumina gel can be separately prepared and then mixed in the desired proportions. Alternatively, a formed silica gel can be treated with an aqueous solution of an aluminum salt, and the alumina precipitated in the silica gel by the addition of a precipitant. In another method, the silica-alumina can be prepared by first forming an acid-stabilized silica sol and then adding an adsorptive alumina to raise the pH and cause the gelation of the mixture. If desired, various halides can be incorporated in the support to give additional acidity.

After preparation of the siliceous cracking component, the latter is preferably impregnated with an aqueous solution of a water-soluble salt of nickel. The concentration of the salt in this solution and the quantity of solution used to impregnate the support is such that from 1 to 35 percent, and preferably 2 to 25 percent, of nickel is disposed on the cracking support. Representative salts which may be employed to effect said impregnation are the chlorides, nitrates and acetates of nickel, although other decomposable salts may be employed if desired, including various metallo-organic compositions such as the chelates. Instead of following the foregoing impregnation procedure, the nickel salts can be incorporated in the siliceous catalyst component as the same is being formed, in which case the composition can also be dried (and calcined, if desired). The catalyst can be used in the form of pellets, beads, extruded or other particle shapes. Thus, good results have been obtained with a catalyst mass made up of small beads having an average diameter of about ⅛-inch, as well as with a crushed aggregate prepared from said beads. Good results can also be obtained when the catalyst is ground to a fineness suitable for "fluidized" operations.

The resulting impregnated support is then preferably subjected to a heat-treating (thermactivation) step, whereby it is heated to a temperature in the range of from about 1200 to 1600 F., and preferably in the range of from about 1300° to 1550° F. This heat-treating step can be conducted in several ways. The preferred method is to contact the particulate, substantially oxidized nickel impregnated support with a relatively dry (having a water vapor partial pressure of less than about 0.5 p.s.i.a.), nonreducing gas such as air, nitrogen, or carbon dioxide at a rate which is preferably at least 10 cu. ft. per hour per cu. ft. of catalyst (10 VHSV) at a temperature within the noted range and at a pressure which can be atmospheric, or superatmospheric. Additionally, thermactivation can be done by contacting the catalyst mass at a temperature of from 1200° to 1600° F. under a pressure of less than about 1 millimeter of mercury absolute. In either method, the contact time should extend over a period of from about 0.25 to 48 hours. When lower temperatures of the 1200° to 1600° F. range are employed, say from 1200° to 1350° F., contact periods over 24 hours are particularly effective; whereas at the higher temperatures of 1500° and 1600° F., periods of from 15 to 60 minutes are more appropriate.

ACTIVATION METHOD

The catalyst, after drying (or thermactivation, if such is employed), is contacted with phosphine. Preferably, contact is made in the gaseous state at an elevated temperature, and, even more preferably, at a temperature in the range of from about 100° to 1000° F. This activation can be done in situ (in a reaction zone employing the catalyst) and can also be done by phosphine gas alone or in admixture with other gases such as hydrogen, hydrocarbons and the like. The contact should be such that at least 0.05 weight percent of the catalyst is $PH_3$. Preferably, the amount should exceed about 0.1 weight percent. The activation can be done on freshly prepared catalyst or following catalyst regeneration, the latter being conducted by conventional oxidation techniques.

The catalyst can also be activated by dissolving $PH_3$ in a hydrocarbon liquid, such as feed, hexane, etc., that does not react with the $PH_3$, and then contacting the catalyst, either before the catalyst is employed in the reaction zone, or actually during its use in the reactor.

UTILITY OF ACTIVATED CATALYST

As noted, the activated catalyst of the present invention is particularly suitable for use in hydrocracking such petroleum distillates as naphthas, kerosenes, gas oils, cycle oils, and the like. These distillates can be of straight-run origin or derived from the effluents of various petroleum processing operations such as thermal or catalytic cracking, reforming, hydrofining, and other well-known refining processes. Also, feeds derived from such sources as shale, gilsonite, coal tar distillates are suitable. Generally, these feeds boil in the range of from about 200° to 900° F. or more. Further, the feeds are preferably free of compounds that are known to adversely affect catalyst activity, such as those containing oxygen and/or nitrogen.

The feedstock can be introduced to the hydrocracking zone as either a liquid, vapor, or mixed liquid-vapor phase, depending upon the temperature, pressure proportions of hydrogen and boiling range of the charge stock utilized. The feed is generally introduced in admixture with at least 750 s.c.f. (standard cubic feet) of hydrogen per barrel of total feed (including both fresh as well as recycle feed, if the latter is employed). With feedstock such as naphthas, gas oils and cycle oils, at least 500 s.c.f. of hydrogen are normally consumed in the hydrocracking zone per barrel of total feed converted to synthetic products, i.e., those lower molecular weight products boiling below the initial boiling point of the fresh feed. The hydrogen stream admixed with the incoming feed can be conveniently made up of recycle gas recovered from the effluent from the hydrocracking zone, together with fresh make-up hydrogen.

The hydrocracking conditions employed in the hydrocracking zone can be varied over relatively wide ranges of temperature, pressure, and feed space velocity, but certain more narrowly defined portions of these ranges are preferred.

In general, the hydrocracking reaction may be conducted at temperatures ranging from about 350° to 800° F. or even higher, but it is preferred that they be maintained within the range of from about 400° to 700° F. as it has been found that the product distribution is much more favorable when the reaction is conducted within the noted low temperature preferred range. The pressures employed in the hydrocracking zone are in excess of about 150 p.s.i.g. and may range upwardly to 2500 or 3000 p.s.i.g., with a preferred range being a total pressure of from about 500 to 2000 p.s.i.g. when employing naphthas, gas oils and cycle oils as feedstocks. Somewhat lower pressures can be employed when single molecular species-type feedstocks are employed. Generally, the hydrocracking zone feed may be introduced into the reaction zone at a liquid hourly space velocity (LHSV) of from about 0.1 to 20.0 or more volumes of hydrocarbon (calculated as liquid) per superficial volume of catalyst per hour (v./v./hr.) with a preferred rate being from about 0.5 to 15.0 v./v./hr.

TEST PROCEDURE

As hereinbefore noted, the catalyst activation method of the present invention produces a hydrocarbon conversion catalyst of enhanced activity. Inasmuch as the subject catalyst has particular utility in hydrocracking reactions, this enhanced activity can best be shown by a test employing such a reaction. In this test, the so-called "activity index" of each catalyst can be determined and compared. The higher the activity index, the more active the catalyst is for hydrocracking, since it refers to the degree of conversion to synthetic products.

The test to determine the activity index of the catalyst broadly involves a determination of the conversion of a standard and readily obtainable hydrocarbon feedstock of defined physical and chemical characteristics to products falling below the boiling point of said stock under defined operating conditions. The feedstock employed is a catalytic cycle oil recovered as a distillate fraction from the effluent of a fluid type of catalytic cracking unit, the recovered fraction being one containing essentially equal proportions of aromatics and of paraffins plus naphthenes, and boiling over a range of from approximately 400° to 575° F. as determined by ASTM D–158, prior to any hydrofining treatment given the feed to reduce its basic nitrogen content to a level below 5 p.p.m., this being the maximum amount permitted in the test feed. The specific test feed employed in obtaining the activity index values of all catalysts given herein was obtained from a fluid catalytic cracking unit being charged with a mixture of light and heavy gas oils cut from a Los Angeles Basin crude. This cycle oil test feed had a gravity of 28° API, an ASTM D–158 start of about 400° F., and a basic nitrogen content of about 175 p.p.m. The test stock was hydrofined by passing the same along with 3500 s.c.f. of hydrogen per barrel of naphtha through a hydrofining catalyst containing cobalt oxide (2 percent cobalt) on a coprecipitated molybdena-alumina (9 percent molybdenum) support at a pressure of 800 p.s.i.g., an LHSV of 1, and at a temperature between 700° and 750° F. This hydrofining operation was accompanied by a hydrogen consumption of 300 to 400 s.c.f. of hydrogen per barrel of feed and resulted in a reduction of the basic nitrogen content in the liquid effluent to less than 5 p.p.m. The hydrofined test stock had the following inspections.

*Table I.—Inspections of Hydrofined Cycle Oil Test Sample*

| | |
|---|---|
| Gravity, ° API | 30 |
| Aniline point, ° F | 93 |
| Nitrogen (basic), p.p.m | Below 5 |
| Aromatics, vol. percent | 48 |
| Olefins, vol. percent | 1 |
| Paraffins plus naphthenes, vol. percent | 51 |
| ASTM Distillation (D–158), ° F.: | |
| Start | 357 |
| 5% | 420 |
| 10% | 434 |
| 30% | 460 |
| 50% | 476 |
| 70% | 493 |
| 90% | 519 |
| 95% | 532 |
| End point | 570 |

The equipment employed in determining the activity index of the catalyst is a conventional continuous feed pilot unit, operated once-through with hydrocarbon feed and hydrogen gas. It consists of a cylindrical reaction chamber operated downflow with a preheating section, followed by a section containing the catalyst under test, and enclosed in a temperature controlled metal block to permit controlled temperature operation, together with the necessary appurtenances, such as feed burettes, feed pump, hydrogen supply, condenser, high-pressure separator provided with means for sampling the gas and liquid phases, back-pressure regulators and thermocouples. For accuracy in hydrogen feed, hydrogen is compressed into a hydrogen accumulator or burette whence it is fed to the reactor by displacement with oil fed at constant rate from a reservoir by means of a pump.

In testing a catalyst to determine its activity index, the foregoing hydrofined cycle oil test stock, along with 12,000 s.c.f. of hydrogen per barrel of feed, is passed through a mass of catalyst (50 ml. were actually employed) at a liquid hourly space velocity of 2 and at a furnace temperature of 570° F. The run is continued for 14 hours under these conditions, with samples being collected at about 2-hour intervals. These samples are allowed to flash off light hydrocarbons at ambient temperature and pressure, following which a determination is made of the API gravity of each sample. The aniline point of the samples may also be determined when it is desired to obtain an indication of the relative tendency of the particular catalyst to hydrogenate aromatics present in the feed. The individual API gravity values are then plotted and a smooth curve is drawn from which an average value may be obtained. Samples collected at the end of the eighth hour of operation are usually regarded as representative of steady-state operating conditions and may be distilled to determine conversion to product boiling below the initial boiling point of the feed. This conversion under steady test conditions is a true measure of the activity of the catalyst. However, the API gravity rise, that is, the API gravity of the product sample or samples minus the API gravity of the feed, is a rapid and convenient method of characterizing the catalyst which correlates smoothly with conversion. For convenience, the foregoing API gravity rise is referred to as the activity index of the catalyst.

While reference has been made above to the use of a particular catalytic cycle stock in connection with determining the activity index of the catalyst, it is believed that similar activity index values can be obtained with catalytic cycle stocks obtained from other than California crudes provided the sample employed as feed has substantially the same characteristics as that of the feed described above. While the use of such other test feeds may give slightly different absolute values than those described herein, such differences are without influence on conclusions reached relating to catalyst activity inasmuch as the test stock is serving primarily as a relative standard by which to judge the conversion activity of the catalyst.

EXAMPLE

Four separate catalyst samples were prepared by impregnating silica-alumina (90 percent to 10 percent by weight, respectively) cracking catalyst with about 3.0 weight percent nickel. Following impregnation, the catalysts were dried, calcined at about 1000° F. and thermactivated at about 1400° F. for 24 hours in a stream of air. One of the samples so treated was set aside and designated "Catalyst A." Two of the samples were sulfided by contact with methyl disulfide and hydrogen at 570° F. One of these nickel sulfide catalysts was designated "Catalyst B." The remaining non-sulfided catalyst and sulfided catalyst were both activated according to the present invention in the following manner.

Phosphine was prepared by slowly adding water to $Ca_3P_2$. Enough $Ca_3P_2$ was used to provide about six times the phosphine needed to convert all the nickel in the catalysts to $Ni_3P_2$. The gas was stripped of diphosphine by bubbling through a 10 percent solution of sulfuric acid and was then passed over the catalysts at a temperature of from about 570° to 610° F. The weight of the catalyst increased 0.13 percent, but, since water was liberated from the catalyst, the actual amount of $PH_3$ adsorbed was somewhat greater than 0.13 percent. The catalysts were then flushed with dry nitrogen at about 600° F. for about one hour. The phosphine-activated, sulfided catalyst was designated "Catalyst C" and the activated non-sulfided catalyst was labelled "Catalyst D."

The four catalysts were then subjected to the 570° F. activity test described above. The activity indices and aniline points after eight hours on-stream time are shown for each catalyst in the following table:

Table II

| Catalyst | Activity Index | Aniline Point, ° F. |
|---|---|---|
| A | 13.8 | 105 |
| B | 10.3 | 103 |
| C | 7.2 | 120 |
| D | 21.7 | 142 |

From the above table, it can be seen that "Catalyst D," comprising non-sulfided nickel activated by phosphine, was considerably more active for hydrocracking than any other nickel catalyst. Further, it can be seen that the activation procedure enhanced the activity of the non-sulfided nickel catalyst, whereas the procedure actually reduced the hydrocracking activity of the nickel sulfide catalyst. Also, the phosphine activation step increased the hydrogenation activity of both sulfided and non-sulfided catalyst as is shown by the increase in the aniline point.

It might be noted that a catalyst, essentially identical to "Catalyst B," which was contacted with enough 5 M phosphoric acid to form nickel phosphate from about 88 percent of the nickel on the support was not enhanced with respect to hydrocracking activity, but, to the contrary, was actually reduced to an activity less than the original catalyst.

I claim:

A process for increasing the hydrocracking and hydrogenation activity of a catalyst consisting essentially of from 1 to 35 weight percent non-sulfided nickel disposed on an active siliceous cracking support, said support containing at least 40 weight percent silica, which comprises contacting said catalyst with a phosphine-containing fluid at a temperature in the range of from about 100° to 1000° F. for a period sufficient such that at least 0.05 weight percent of the final catalyst is $PH_3$.

References Cited in the file of this patent

UNITED STATES PATENTS 2,894,936     Benson                July 14, 1959